May 2, 1950  F. M. GUY  2,505,767
RESILIENT BUSHING
Filed Oct. 9, 1946
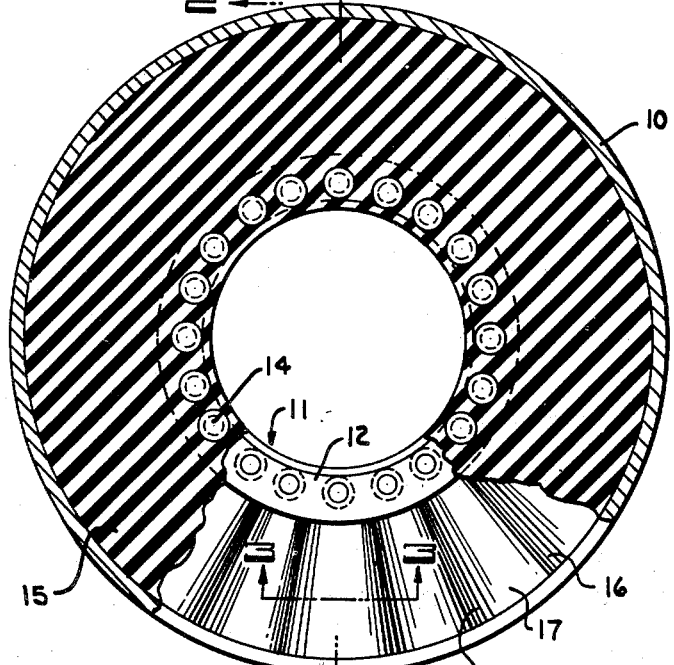
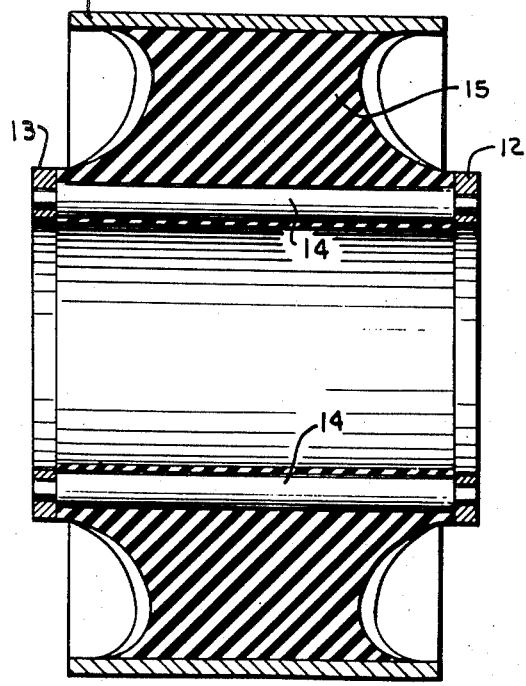
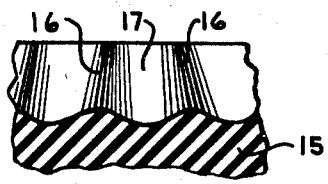
INVENTOR.
FREDERICK M. GUY
BY
Arthur M. Smith
ATTORNEY Patented May 2, 1950

2,505,767

UNITED STATES PATENT OFFICE 2,505,767

RESILIENT BUSHING

Frederick M. Guy, Detroit, Mich., assignor to Guy & Murton, Inc., Detroit, Mich., a corporation of Michigan Application October 9, 1946, Serial No. 702,242

3 Claims. (Cl. 287—85)

The present invention relates to a resilient bushing and more particularly to such a bushing in which a resilient material is secured by bonding or vulcanizing to a substantially non-resilient central core and to a circumferential shell portion which may be either a rigid or a yieldable substantially non-resilient material.

Resilient bushings of the present invention are an improvement on the resilient bushings shown in my United States Letters Patent No. 1,978,940, issued October 30, 1934, and are designed particularly to withstand particularly severe load and operating conditions without substantial deterioration of the bushing. By way of example, but not of limitation, the resilient bushings embodying the present invention are particularly adapted for use in resilient universal joints or couplings of the type shown in my prior United States Letters Patent No. 1,978,939, issued October 30, 1934, and No. 2,195,647, issued October 2, 1940, as well as in other like or similar devices in which a driving and a driven member are connected in driving relationship in such a manner as to permit various misalignments thereof while coupled in a driving relationship. Other uses for resilient bushings embodying the present invention include, by way of example, engine mountings, spring shackles, clutches, sound and vibration insulators or dampeners, and resilient cushions for mounting or connecting various types of mechanical parts or units. In all such uses, it is essential that the resilient bushing to be held in place or securely connected with mechanical connections to both its core and its circumferential shell in such a manner as to eliminate relative movement between such connections and the core or the shell as the case may be. This requires that both the core and the shell have sufficient longitudinal rigidity to permit a mechanical clamping thereof without causing the collapse of the core or shell.

It has been proposed heretofore to provide a preloaded resilient bushing by a process in which pressures in excess of the elastic limit of the resilient material are imposed on the resilient material which is locked between a rigid core or stud and a rigid circumferential shell. Such devices have a relatively limited field of application since a high degree of preloading of the resilient material is depended upon to hold the parts of the bushing in their respective positions. In many instances, this preloading destroys the degree of resiliency required for the optimum operation of the bushing.

The resilient body portion of a resilient bushing embodying the present invention may be formed of any desired elastomeric material which has the required resilient properties. Rubber, either natural or synthetic, or blends thereof, is a satisfactory material and is the material most frequently employed for use in such bushings. For particular applications, however, other suitable resilient elastomeric materials also may be utilized within the scope of the present invention.

Loading of the resilient bushing may be accompanied by the formation of localized areas in the exposed end surfaces of the resilient material where the skin of material has been placed in tension due to the displacement of a portion of the body mass of the resilient material in response to the forces imposed thereon. The placing of the skin surface under localized tension will cause its rupture whenever the forces causing the displacement of a portion of the body mass of the resilient material are greater than the strength of the skin surface area of the bushings. Once rupture of the skin surface area occurs, the resultant crack grows rapidly while the bushing is in use and soon causes the complete failure of the block.

It is, therefore, an object of the present invention to provide a resilient bushing in which the skin surface areas of the resilient materials therein are increased by the provision of folds molded therein to permit the extension of such areas to accommodate the displacement of a portion of the body mass of the resilient material without subjecting the skin surface areas to tension strains sufficient to effect localized ruptures therein.

It is a further object of the present invention to provide a resilient bushing in which the exposed end surface areas of the resilient material are provided with a series of folds which permits the end surface areas to stretch to accommodate displacement of a portion of the mass of the resilient material without localizing tension strains in the end surface areas of the resilient material.

It is a further object of the present invention to provide a resilient bushing having a relatively long life in service under extreme operating conditions where the compression forces exerted on the bushings are sufficient to effect a displacement of a portion of the body mass of the resilient material and in which localized tension strains in the exposed surface areas thereof are eliminated.

Other objects of this invention will appear in the following description and appended claims, reference being had to the accompanying drawings forming a part of this specification wherein like reference characters designate corresponding parts in the several views.

In the drawings:

Fig. 1 is a plan view, partially in section, showing a resilient bushing embodying the present invention.

Fig. 2 is a section taken substantially on the line 2—2 in the direction of the arrows, Fig. 1.

Fig. 3 is a fragmentary section taken substantially on the line 3—3 in the direction of the arrows, Fig. 1.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A resilient bushing embodying the present invention, as here shown, comprises a rigid circumferential shell 10 preferably formed of a section of steel tubing or the like, it being understood, however, that, if desired, the circumferential shell 10 may be formed of flexible but substantially non-resilient material such, for example, as a fabric reinforcing member. A central core portion 11 may be formed of any desired type of substantially non-resilient material. The particular core construction herein disclosed is the subject matter of my co-pending application, Serial No. 702,241, and is here shown by way of example rather than by way of limitation. The core construction as here shown comprises annular end members 12 and 13 in which are provided a series of spaced openings whose centers lie on a line concentric with the circumference of the members 12 and 13. A plurality of rods 14 of substantially the same length as the length of the core of the bushing have their end portions located in the spaced holes provided in the members 12 and 13. The end members 12 and 13 and the plurality of spaced rod members 14 thus comprise a cylindrical sleeve member, the ends of which comprise the members 12 and 13 and the body of which is formed by the spaced rod members 14. A body of resilient material 15, preferably rubber, either natural or synthetic or a blend of natural and synthetic rubber, is molded between the inner surface of the shell 10 and the core 11. The provision of the spaced rod members 14 permits the resilient material 15 to flow through the spaces between the members 14 during the molding of the bushing and to surround these members in a body of the resilient material 15. By this construction, the core member 11 is securely anchored in place in the resilient bushing in such a manner that bodily movement of the core 11 relative to the shell 10 is accommodated by displacement of the resilient material 15. In the particular construction here shown, the bushing 11 is designed in such a manner as to be substantially non-flexible so as to accommodate all relative movements between the shell 10 and the core 11 solely by displacement of one element relative to the other to the extent permitted by the resilient displacement of a portion of a body mass of the resilient material 15. It is to be understood, however, that, if desired, a yieldable material may be employed to form both the core 11 and the shell 10 so as to permit additional relative movement between the core 11 and the shell 10 by radial movements occurring within the core 11 or the shell 10.

In the particular construction here shown, the end portions of the resilient material 15 are formed to provide a plurality of radially extending ridges or folds 16 and a plurality of radially extending valleys 17. The valleys 17 are disposed, one each between two spaced adjacent ridges or folds 16. By this construction, the total surface area of the ends of the resilient material 15 is increased relative to the total mass of the resilient material over that of a block in which the ends are provided with a smooth or regular surface contour. Upon displacement of a portion of the body mass of the resilient material, the ridge surfaces 16 and the valley surfaces 17 tend to be smoothed out before the entire end surface areas are placed under tension. It will be seen, therefore, that the increased surface areas due to the formation of the end surfaces of a resilient bushing utilizing this construction provide a bushing construction which will stand appreciably higher loadings without failures occurring on the surfaces of the resilient material than is the case with conventional types of resilient bushings provided with smooth end surfaces.

I have found that the most successful working of a resilient mass of material is accomplished if the extent of the surface area is such that there is a uniform distribution of the strains across the whole of the resilient surfaces. In the event of a crack due to localized working conditions, the subsequent loads tend to localize in the weakest part of the structure and as these locally stressed areas are broken, the entire body of resilient material is rendered ineffective as the strains are thereafter taken only in the weakest areas. By the provision of the ribs or folds 16, the surface of the resilient material is increased so that the ribs or folds are stretched and flattened into the body of the resilient material before an actual localized tension strain is set up in the surface of the material.

I claim:

1. A resilient bushing comprising a central core and a circumferential shell secured respectively to the central portion and the circumferential edge portion of a continuous resilient body member, said body member including a plurality of spaced radially extending smooth rounded surface ribs molded in the exposed end surfaces thereof.

2. A resilient bushing including spaced members connected by a continuous body of molded resilient material having a plurality of alternate radially extending smooth rounded surface ribs and valley areas in the exposed surfaces thereof.

3. A cylindrical resilient bushing including spaced rigid structural members joined by an annular continuous resilient body element adapted to permit movement of said structural members by displacement of a portion of the mass of said resilient body element, said resilient body element having exposed annular end surfaces provided with a plurality of alternate radially extending smooth rounded rib and valley areas molded therein.

FREDERICK M. GUY.

REFERENCES CITED

The following references are of record in the file of this patent:

UNITED STATES PATENTS

| Number | Name | Date |
|---|---|---|
| 2,252,938 | Lord | Aug. 19, 1941 |
| 2,396,352 | Venditty | Mar. 12, 1946 |

FOREIGN PATENTS

| Number | Country | Date |
|---|---|---|
| 213,019 | Great Britain | Mar. 27, 1924 |
| 478,101 | Great Britain | Jan. 12, 1938 |